(12) United States Patent
Wang et al.

(10) Patent No.: US 11,859,269 B1
(45) Date of Patent: Jan. 2, 2024

(54) HIGH STRENGTH-DUCTILITY MATCHED OXIDE-PARTICLES DISPERSION STEEL, PREPARATION METHOD AND APPLICATION THEREOF

(71) Applicant: University of Science and Technology Beijing, Beijing (CN)

(72) Inventors: You Wang, Beijing (CN); Zhangjian Zhou, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 18/125,173

(22) Filed: Mar. 23, 2023

(30) Foreign Application Priority Data

May 31, 2022 (CN) .......................... 202210606267.X

(51) Int. Cl.
| | | |
|---|---|---|
| C22C 33/06 | (2006.01) | |
| C22C 33/00 | (2006.01) | |
| C22C 38/22 | (2006.01) | |
| C22C 38/24 | (2006.01) | |
| C22C 38/34 | (2006.01) | |
| C22C 38/00 | (2006.01) | |

(52) U.S. Cl.
CPC ............ *C22C 33/06* (2013.01); *C22C 33/006* (2013.01); *C22C 38/002* (2013.01); *C22C 38/22* (2013.01); *C22C 38/24* (2013.01); *C22C 38/34* (2013.01)

(58) Field of Classification Search
None
See application file for complete search history.

(56) References Cited

FOREIGN PATENT DOCUMENTS

| | | | |
|---|---|---|---|
| CN | 113913706 A | * | 1/2022 |
| CN | 113913706 A | | 1/2022 |
| JP | 2001342537 A | | 12/2001 |

* cited by examiner

*Primary Examiner* — Anthony M Liang
(74) *Attorney, Agent, or Firm* — Kaplan Breyer Schwarz, LLP; Stuart H. Mayer

(57) ABSTRACT

Disclosed are a high strength-ductility matched oxide-particles dispersion steel, a preparation method and application thereof, belonging to the technical field of novel structural materials. The high strength-ductility matched oxide-particles dispersion steel comprises the following components in percentage by mass: chromium (Cr) 11.0-13.0 percent (%), tungsten (W) 1.0-2.0%, vanadium (V) 0.1-0.2%, yttrium (Y) 0.3-0.4%, oxygen (O) 0.05-0.15%, silicon (Si) 1.5-2.5%, carbon (C) ≤0.0016%, with iron (Fe) and unavoidable impurities accounting for a rest. The high strength-ductility matched oxide-particles dispersion steel in the present application is prepared, using a powder metallurgical preparation method, by introducing high-content of silicon elements and introducing high-density oxide particles with a complete core-shell structure using a specific heat treatment regime.

3 Claims, 3 Drawing Sheets

HIGH STRENGTH-DUCTILITY MATCHED OXIDE-PARTICLES DISPERSION STEEL, PREPARATION METHOD AND APPLICATION THEREOF

CROSS-REFERENCE TO RELATED APPLICATIONS

This application claims priority to Chinese Patent Application No. 202210606267.X, filed on May 31, 2022, the contents of which are hereby incorporated by reference.

TECHNICAL FIELD

The present disclosure relates to the technical field of novel structural materials, and in particular to a high strength-ductility matched oxide-particles dispersion steel, a preparation method and an application thereof.

BACKGROUND

In view of the serious consequences of nuclear accidents, fuel cladding materials for nuclear reactors are facing higher requirements from the nuclear industry for the accident tolerance rate and related service performance, including but not limited to high temperature resistance to irradiation damage, high strength, high toughness, and good corrosion resistance.

Conventionally zirconium alloy, owing to excellent service performance, is often used as one of the cladding materials for nuclear reactors; however, the zirconium alloy has a small accident tolerance rate, as it produces a large amount of hydrogen and causes hydrogen explosion when it is in contact with high temperature water vapor, bringing great hidden hazards. In fact, hydrogen explosion is indeed one of the main reasons for the large-scale impact of the Fukushima nuclear accident. Therefore, the nuclear industry is now searching for materials with a high tolerance for accidents. Oxide-particles dispersion steel (ODS) is one of the most promising candidates. The high-density dispersed ultra-fine oxide particles in ODS steels not only increase the strength but also have the properties of trapping irradiation defects and suppressing irradiation damage, therefore showing excellent high-temperature resistance to irradiation damage. These features make ODS steel also the most promising cladding material for advanced Generation IV reactors and nuclear fusion reactors. Yet, the ODS steel developed so far has defects of high strength and poor plasticity.

SUMMARY

The present application provides a high strength-ductility matched oxide-particles dispersion steel, a preparation method and an application thereof, so as to solve the above problems. By introducing oxide-particles with a high density and a complete core-shell structure using a special heat treatment step, an oxide-particle dispersion steel with both high strength and high toughness is developed accordingly.

In order to achieve the above objectives, the present application provides the following technical schemes:

one of the technical schemes of the present application provides a high strength-ductility matched oxide-particles dispersion steel, including the following components in percentage by mass: chromium (Cr) 11.0-13.0 percent (%), tungsten (W) 1.0-2.0%, vanadium (V) 0.1-0.2%, yttrium (Y) 0.3-0.4%, oxygen (O) 0.05-0.15%, silicon (Si) 1.5-2.5%, carbon (C) ≤0.0016%, with iron (Fe) and unavoidable impurities accounting for a rest.

Another technical scheme of the present application provides a preparation method of the high strength-ductility matched oxide-particles dispersion steel, including:

preparing pre-alloyed powders using alloy components of Cr, W, V and Fe according to a proportion of Cr 12.0%, W 2.0%, V 0.1% and Fe 85.9%, then mixing with 2% Si powder, 0.2% Y powder and 0.25% $Y_2O_3$ powder, followed by ball milling, sintering, forging, heat treatment and quenching, so as to obtain the high strength-ductility matched oxide-particles dispersion steel.

Optionally, the pre-alloyed powders are in a particle size of 5-30 micrometers (μm), the Si powder is in a particle size of 1-5 μm, the Y powder is in a particle size of 1-5 μm, and the $Y_2O_3$ powder is in a particle size of 1-5 μm.

Optionally, the sintering adopts a hot isostatic pressing sintering process.

Optionally, the forging adopts a two-step method of hot forging+warm forging, where the hot forging includes free-forging after keeping temperature at 1,150 degree Celsius (° C.) for 1 hour (h), using an orthogonal forging method with a forging ratio of 2:1, and naturally cooling after forging; and the warm forging includes forging after keeping temperature at 800° C. for 3-5 h using an orthogonal forging method with a forging ratio of 2:1, and cooling by burying in sand after forging.

Optionally, the heat treatment includes temperature of 1,150-1,250° C., and a duration of 20 minutes (min).

Optionally, the quenching is carried out under a temperature of 20° C.

Optionally, argon gas is continuously introduced during a process of ball milling, with agate balls being used as grinding balls; the gas is kept clean to avoid any introduction of elemental C, so that an alloy material with a low content of C is obtained.

Another technical scheme of the present application provides an application of the high strength-ductility matched oxide-particles dispersion steel in preparing cladding materials of nuclear reactors fuel, structural materials of aero-engines and structural materials of steam transportation pipelines of power plants.

The present application achieves the following beneficial technical effects:

the high strength-ductility matched oxide-particles dispersion steel, the preparation method and application thereof are prepared by using methods of specific heat treatment steps and two-step forging, whereby stable and high-density oxide-particles with complete core-shell structure are introduced into the high strength-ductility matched oxide-particles dispersion steel, in which the shell component is amorphous chromium/vanadium-rich shell and the core component is yttrium silicon oxide; the amorphous chromium/vanadium rich shell around the oxide-particles is low in hardness, relieving the stress concentration around the particles and improving the toughness of the high strength-ductility matched oxide-particles dispersion steel;

moreover, the silicon added in a high amount in the high strength-ductility matched oxide-particles dispersion steel precipitates a large number of yttrium silicon oxides, which improves the strength of the high strength-ductility matched oxide-particles dispersion steel; and a simultaneous action of the silicon element and the core-shell structure results in a high strength and toughness of the prepared high strength-ductility matched oxide-particles dispersion steel; and using a powder metallurgical preparation method, the present application prepares a high strength-ductility matched oxide-particles dispersion steel by introducing high-density oxide particles with a complete core-shell structure using a heat treatment regime different from the experiences (in the prior art, oxide particles of this structure only is obtained by holding at low temperature for a short time); it meets the requirements for the strength and toughness of nuclear reactor fuel cladding materials, and has high commercial value and broad development prospects.

DETAILED DESCRIPTION OF THE EMBODIMENTS

Figure 1:
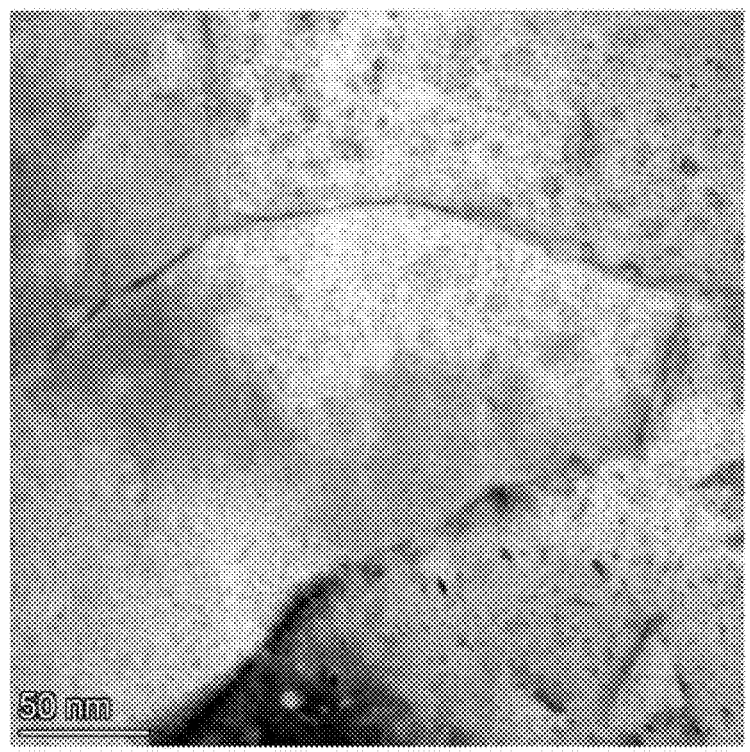
FIG. 1 shows a bright field image of a transmission electron microstructure of a high strength-ductility matched oxide-particles dispersion steel prepared in Embodiment 1.

Various exemplary embodiments of the present application are now described in detail and this detailed description should not be considered as limiting the present application, but should be understood as a rather detailed description of certain aspects, features and embodiments of the present application. It is understood that the terms described in the present application are intended to describe particular embodiments only and are not intended to limit the present application.

In addition, for the ranges of values in the present application, it is to be understood that each intermediate value between the upper and lower limits of the range is also specifically disclosed. Each smaller range between any stated value or intermediate value within a stated range, and any other stated value or intermediate value within a stated range is also included in the present application. The upper and lower limits of these smaller ranges may be independently included or excluded from the scope.

Unless otherwise stated, all technical and scientific terms used herein have the same meaning as commonly understood by those of ordinary skill in the field described in the present application. Although the present application describes only preferred methods and materials, any methods and materials similar or equivalent to those described herein may also be used in the implementation or testing of the present application.

As used herein, the terms "comprising", "including", "having", "containing", etc. are open-ended terms, i.e. meaning including but not limited to.

Embodiment 1

In the present embodiment, a high strength-ductility matched oxide-particles dispersion steel is designed as follows: in percentage by mass, chromium (Cr) 12 percent (%), tungsten (W) 1.50%, vanadium (V) 0.15%, yttrium (Y) 0.35%, oxygen (O) 0.12.00%, silicon (Si) 1.50%, carbon (C) ≤0.0016%, with iron (Fe) accounting for a rest.

A preparation method includes steps as follows:
(1) preparing Cr, W, V and Fe powders with a particle size of 15 micrometers (μm) by gas atomization, weighing and mixing them according to the mass ratio as pre-alloyed powders;
(2) mixing the pre-alloyed powders with 1.5% Si powder (particle size 3 μm) of the total mass of the high strength-ductility matched oxide-particles dispersion steel, 0.08% Y powder (particle size 3 μm) of the total mass of the high strength-ductility matched oxide-particles dispersion steel and 0.35% $Y_2O_3$ powder (particle size 4 μm) of the total mass of the high strength-ductility matched oxide-particles dispersion steel, putting the powder into a large ball mill with the speed set at 200 revolutions per minute (rpm), with a 10:1 ball-to-powder ratio, and ball milling for 60 hours (h); during the ball milling process, argon gas is continuously introduced, and agate balls are used as the grinding balls;
(3) sealing the powder after ball milling in step (2) in a jar and sintering and curing in a hot isostatic oven at a temperature of 1,150 degrees Celsius (° C.) and a pressure of 15 Megapascals (MPa) for 2 h;
(4) forging the cured steel block into a cake-shaped billet by a two-step method of hot forging+warm forging, performing hot forging by free-forging after keeping temperature at 1,150° C. for 1 h, where an orthogonal forging method with a forging ratio of 2:1 is adopted, then naturally cooling after forging, performing warm forging after keeping temperature at 800° C. for 4 h, adopting a die forging method of orthogonal forging with a forging ratio of 2:1, and cooling by burying in sand after forging; and
(5) transferring the billet obtained in step (4) to a muffle furnace for heat treatment at 1,200° C. for 20 min; cooling to 700° C. and taking out, then rapidly quenching in water at 20° C. to obtain the high strength-ductility matched oxide-particles dispersion steel.

See FIG. 1 for a bright field image of a transmission electron microstructure of the high strength-ductility matched oxide-particles dispersion steel prepared in Embodiment 1, from which it can be seen that there exists a high density of core-shell structured oxide-particles in the high strength-ductility matched oxide-particles dispersion steel prepared in Embodiment 1.

Figure 2:
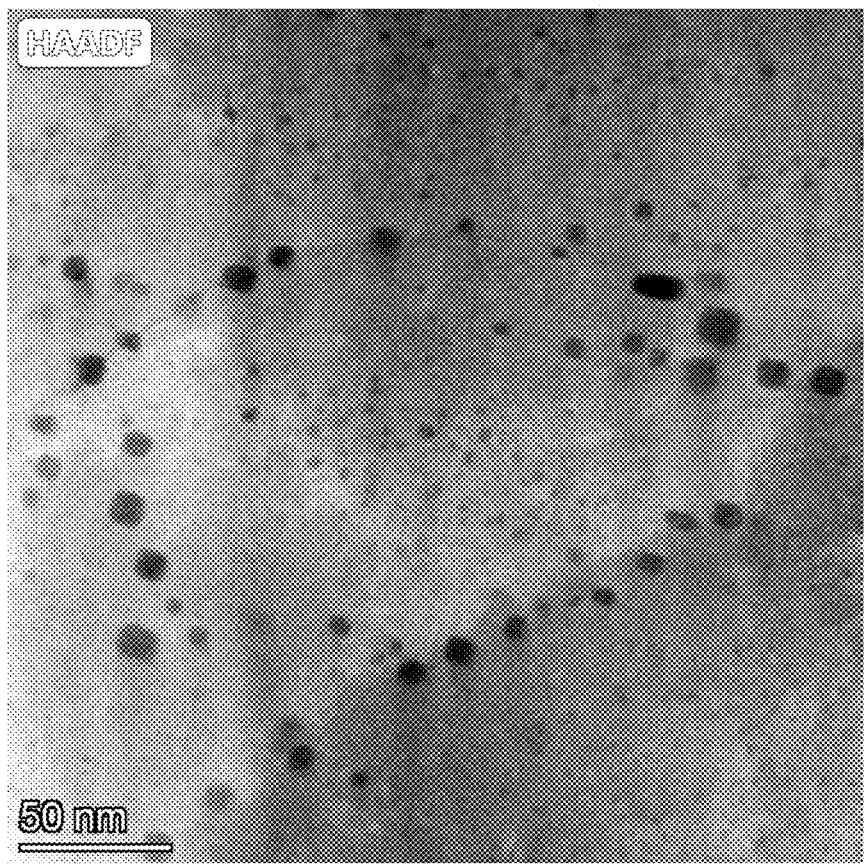
FIG. 2 illustrates a high angle annular dark field (HAADF) image of transmission electron microstructure of high-density, core-shell structured oxide-particles of the high strength-ductility matched oxide-particles dispersion steel prepared in Embodiment 1.

A high angle annular dark field (HAADF) image of the transmission electron microstructure of the high strength-ductility matched oxide-particles dispersion steel prepared in Embodiment 1 is illustrated in FIG. 2, which shows that there is a high density of core-shell structured oxide-particles uniformly distributed within and on grain boundaries in the high strength-ductility matched oxide-particles dispersion steel prepared in Embodiment 1.

Figure 3:
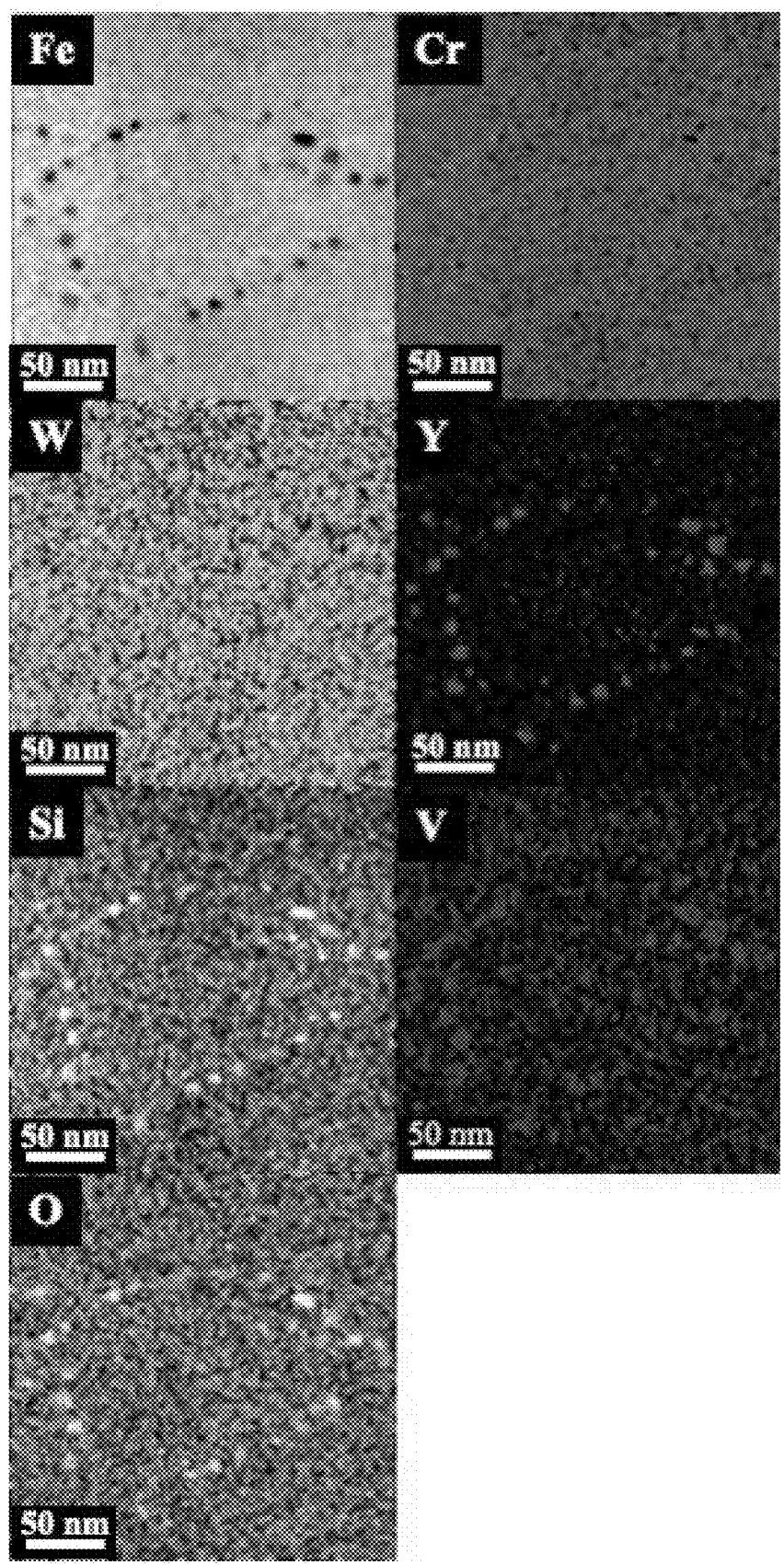
FIG. 3 shows an X-ray surface distribution of an energy dispersion of elements Fe, Cr, W, Y, Si, V and O in the high strength-ductility matched oxide-particles dispersion steel prepared in Embodiment 1.

FIG. 3 shows an X-ray surface distribution of an energy dispersion of elements Fe, Cr, W, Y, Si, V and O in the high strength-ductility matched oxide-particles dispersion steel prepared in Embodiment 1. As can be seen in FIG. 3, there is a high density of core-shell structured oxide-particles with composition of yttrium silicon oxide in the matched oxide particles dispersion steel prepared in Embodiment 1.

The high strength-ductility matched oxide particle dispersion steel prepared in Embodiment 1 is measured to have a tensile strength of 985 MPa and 22.3% plasticity at room temperature and a tensile strength of 289 MPa and 27.1% plasticity at 700° C.

Embodiment 2

In the present embodiment, the high strength-ductility matched oxide-particles dispersion steel is designed as follows: in percentage by mass, Cr 12.0%, W 1.50%, V 0.15%, Y 0.35%, O 0.12%, Si 2.00%, C ≤0.0016%, with Fe accounting for a rest.

The preparation method includes steps as follows:
(1) preparing Cr, W, V and Fe powders with a particle size of 15 μm by gas atomization, weighing and mixing them according to the mass ratio as pre-alloyed powders;
(2) mixing the pre-alloyed powders with 2.0% Si powder (particle size 3 μm) of the total mass of the high strength-ductility matched oxide-particles dispersion steel, 0.08% Y powder (particle size 3 μm) of the total mass of the high strength-ductility matched oxide-particles dispersion steel and 0.35% $Y_2O_3$ powder (particle size 4 μm) of the total mass of the high strength-ductility matched oxide-particles dispersion steel, putting the powder into a large ball mill with the speed set at 200 rpm, with a 10:1 ball-to-powder ratio, and ball milling for 60 h;
(3) sealing the powder after ball milling in step (2) in a jar and sintering and curing in a hot isostatic oven at a temperature of 1,150° C. and a pressure of 15 MPa for 2 h;
(4) forging the cured steel block into a cake-shaped billet by a two-step method of hot forging+warm forging, performing hot forging by free-forging after keeping temperature at 1,150° C. for 1 h, where an orthogonal forging method with a forging ratio of 2:1 is adopted, then naturally cooling after forging, performing warm forging after keeping temperature at 800° C. for 4 h, adopting a die forging method of orthogonal forging with a forging ratio of 2:1, and cooling by burying in sand after forging; and
(5) transferring the billet obtained in step (4) to a muffle furnace for heat treatment at 1,200° C. for 20 min; cooling to 700° C. and taking out, then rapidly quenching in water at 20° C. to obtain the high strength-ductility matched oxide-particles dispersion steel.

The tensile strength and the plasticity of the high strength-ductility matched oxide particle dispersion steel prepared in Embodiment 2 is measured to be 1,128 MPa and 21.7% at room temperature respectively, and 333 MPa and 26.9% at 700° C.

Embodiment 3

In the present embodiment, the high strength-ductility matched oxide-particles dispersion steel is designed as follows: in percentage by mass, Cr 12.0%, W 1.50%, V 0.15%, Y 0.35%, O 0.12%, Si 2.50%, C ≤0.0016%, with Fe accounting for a rest.

The preparation method includes steps as follows:
(1) preparing Cr, W, V and Fe powders with a particle size of 15 μm by gas atomization, weighing and mixing them according to the mass ratio as pre-alloyed powders;
(2) mixing the pre-alloyed powders with 2.5% Si powder (particle size 3 μm) of the total mass of the high strength-ductility matched oxide-particles dispersion steel, 0.08% Y powder (particle size 3 μm) of the total mass of the high strength-ductility matched oxide-particles dispersion steel and 0.35% $Y_2O_3$ powder (particle size 4 μm) of the total mass of the high strength-ductility matched oxide-particles dispersion steel, putting the powder into a large ball mill with the speed set at 200 rpm, with a 10:1 ball-to-powder ratio, and ball milling for 60 h;
(3) sealing the powder after ball milling in step (2) in a jar and sintering and curing in a hot isostatic oven at a temperature of 1,150° C. and a pressure of 15 MPa for 2 h;
(4) forging the cured steel block into a cake-shaped billet by a two-step method of hot forging+warm forging, performing hot forging by free-forging after keeping temperature at 1,150° C. for 1 h, where an orthogonal forging method with a forging ratio of 2:1 is adopted, then naturally cooling after forging, performing warm forging after keeping temperature at 800° C. for 4 h, adopting a die forging method of orthogonal forging with a forging ratio of 2:1, and cooling by burying in sand after forging; and
(5) transferring the billet obtained in step (4) to a muffle furnace for heat treatment at 1,200° C. for 20 min; cooling to 700° C. and taking out, then rapidly quenching in water at 20° C. to obtain the high strength-ductility matched oxide-particles dispersion steel.

The tensile strength and the plasticity of the high strength-ductility matched oxide particle dispersion steel prepared in Embodiment 3 is measured to be 1,477 MPa and 20.9% at a room temperature respectively, and 395 MPa and 25.3% at 700° C.

Comparative Embodiment 1

The preparation method of the high strength-ductility matched oxide-particles dispersion steel in this comparative embodiment is different from Embodiment 1 in that the step (4) is omitted in the present comparative embodiment, and other operations are the same as Embodiment 1.

It is measured that the tensile strength and plasticity of the high strength-ductility matched oxide-particles dispersion steel prepared in Comparative embodiment 1 are 786 MPa and 10.1% respectively at room temperature, and those at 700° C. are 217 MPa and 11.5% respectively; as a result of the omitting step (4), the steel does not have a special core-shell structure or the number of core-shell structures is reduced, causing a reduction in strength and toughness.

As a result of the omitting step (4), the steel does not have oxide-particles with a specific core-shell structure or the number of oxide-particles having core-shell structure is reduced, resulting in a decrease in strength and toughness.

Comparative Embodiment 2

The preparation method of the high strength-ductility matched oxide-particles dispersion steel in this comparative embodiment is different from Embodiment 1 in that the step (5) is omitted in the present comparative embodiment, and other operations are the same as Embodiment 1.

It is measured that the tensile strength and plasticity of the high strength-ductility matched oxide-particles dispersion steel prepared in Comparative embodiment 2 are 815 MPa and 11.9% respectively at room temperature, and those at 700° C. are 225 MPa and 14.7% respectively; the reduction of strength and toughness is caused by the significant reduction in the number of oxide particles with a special core-shell structure in the steel after the omitting step (5).

Comparative Embodiment 3

The preparation method of the high strength-ductility matched oxide-particles dispersion steel in this comparative embodiment is different from Embodiment 1 in that the heat treatment in the step (5) is carried out under a temperature of 900° C. in the present comparative embodiment, and other operations are the same as Embodiment 1.

The tensile strength and plasticity of the high strength-ductility matched oxide-particles dispersion steel prepared in Comparative embodiment 3 are measured to be 868 MPa and 13.4% respectively at a room temperature, and those at 700° C. are 266 MPa and 20.5% respectively; this is due to the significant effect of the temperature of the heat treatment in the step (5) on the microstructure of the steel, resulting in the failure to precipitate or the disappearance of the oxide-particles of the special core-shell structure, and consequently a reduction in strength and toughness.

The above-mentioned embodiments only describe the preferred modes of the application, and do not limit the scope of the present application. Under the premise of not departing from the design spirit of the present application, various modifications and improvements made by ordinary technicians in the field to the technical scheme of the present application shall fall within the protection scope determined by the claims of the present application.

What is claimed is:

1. A preparation method of oxide-particle dispersion steel comprising components in percentage by mass: chromium (Cr) 11.0-13.0%, tungsten (W) 1.0-2.0%, vanadium (V) 0.1-0.2%, yttrium (Y) 0.3-0.4%, oxygen (O) 0.05-0.15%, silicon (Si) 1.5-2.5%, carbon (C) ≤0.0016%, and a balance of iron (Fe) and unavoidable impurities;

wherein the method comprises:

preparing pre-alloyed powders of Cr, W, V and Fe using the components according to a proportion, then mixing with Si powder, Y powder and $Y_2O_3$ powder, followed by ball milling, sintering, forging, heat treatment and quenching, so as to obtain the high strength-ductility matched oxide-particles dispersion steel;

wherein the forging adopts a two-step method of hot forging and warm forging, the hot forging comprises free-forging after keeping a temperature at 1,150° C. for 1 h, using an orthogonal forging method with a forging ratio of 2:1, and naturally cooling after forging; and the warm forging comprises forging after keeping a temperature at 800° C. for 3-5 h using an orthogonal forging method with a forging ratio of 2:1, and cooling by burying in sand after forging;

the heat treatment is at a temperature in a range of 1,150-1,250° C. for a duration of 20 min; and the quenching is carried out under a temperature of 20° C.

2. The preparation method according to claim 1, wherein the pre-alloyed powders are in a particle size of 5-30 μm, the Si powder is in a particle size of 1-5 μm, the Y powder is in a particle size of 1-5 μm, and the $Y_2O_3$ powder is in a particle size of 1-5 μm.

3. The preparation method according to claim 1, wherein the sintering is a hot isostatic pressing sintering process.

* * * * *